United States Patent [19]

Palmer

[11] Patent Number: 5,320,124
[45] Date of Patent: Jun. 14, 1994

[54] REGULATOR ADAPTABLE FOR MAINTAINING A CONSTANT PARTIAL VACUUM IN A REMOTE REGION

[76] Inventor: David W. Palmer, 200 Berkeley Rd., North Andover, Mass. 01845

[21] Appl. No.: 965,907

[22] Filed: Oct. 23, 1992

Related U.S. Application Data

[63] Continuation-in-part of Ser. No. 850,767, Mar. 13, 1992, Pat. No. 5,251,654, Ser. No. 851,017, Mar. 13, 1992, Pat. No. 5,255,710, Ser. No. 852,084, Mar. 13, 1992, Pat. No. 5,255,709, and Ser. No. 851,016, Mar. 13, 1992, Pat. No. 5,220,940, each is a continuation-in-part of Ser. No. 669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.$^5$ .................................................. G05D 7/01
[52] U.S. Cl. ..................................... 137/501; 137/503; 137/907
[58] Field of Search ........................ 137/505.38, 505.46, 137/907, 501, 503; 251/282

[56] References Cited

U.S. PATENT DOCUMENTS

| | | | |
|---|---|---|---|
| 3,312,241 | 4/1967 | Bryant | 137/599 |
| 3,978,883 | 9/1976 | Petersen | 137/500 X |
| 4,194,526 | 3/1980 | Stromberg | 137/907 X |
| 4,739,924 | 4/1988 | Kelley | 137/503 X |

Primary Examiner—Stephen M. Hepperle
Attorney, Agent, or Firm—Bromberg & Sunstein

[57] ABSTRACT

A regulator, which may be used to regulate in a remote region a constant partial vacuum. The regulator controls the flow of gas from an environment, through a region and to an evacuation means. The regulator's fluid path is bounded on opposite sides by two plates, which may be hingedly mounted, so that the two plates are substantially parallel to each other. Each of the plates have a conduit side, facing the fluid path, and a side facing a reference pressure. The first plate's reference-pressure side may be exposed to the region's pressure, and the second plate's reference-pressure side may be exposed to the environment's pressure. The regulator also includes an impeder attached to the plates for variably impeding the flow through the path based on the position of the plates. Preferably, the impeder includes a fixed grate and a movable grate. The fixed grate does not move with respect to the path. The movable grate is hingedly attached to the plates at points distal from the pivot points. The two grates are disposed immediately adjacent to each other, so that as the movable grate moves with respect to the fixed grate the impedance on the flow varies.

24 Claims, 4 Drawing Sheets

REGULATOR ADAPTABLE FOR MAINTAINING A CONSTANT PARTIAL VACUUM IN A REMOTE REGION

This application is a continuation-in-part of applications Serial Nos. 07/850,767 (now issued as U.S. Pat. No. 5,251,654), 07/851,017 (now issued as U.S. Pat. No. 5,255,710), 07/852,084 (now issued as U.S. Pat. No. 5,255,709) and 07/851,016, all filed Mar. 13, 1992, and all of which are continuations-in-part of application Serial No. 07/669,746 (now issued as U.S. Pat. No. 5,220,940), filed Mar. 15, 1991, now abandoned, and which is a continuation-in-part of application Serial No. 07/405,835, filed Sept. 11, 1989 and issued Mar. 19, 1991 as U.S. Pat. No. 5,000,221, which is a continuation-in-part of application Serial No. 07/178,505, filed Apr. 7, 1988, now abandoned. Filed concurrently herewith is an application Ser. No. 07/965,909, for a REGULATOR FOR MAINTAINING A SMALL PARTIAL VACUUM by the same inventor as the present invention. All these applications are hereby incorporated herein by reference.

TECHNICAL FIELD

This invention generally relates to a device for regulating the flow of a fluid, particularly a gas, through the device.

BACKGROUND ART

In a heating, ventilating, and air conditioning (HVAC) system, air flow is typically controlled using resistors to slow down the flow of air at different points to obtain the proper air balance throughout a building. When one resistor is adjusted, the pressure level throughout the HVAC system will change; any change in the HVAC system pressure will affect the flow of air past every other resistor. Thus, adjusting a resistor at one point causes "cross-talk" with resistors at other points.

One of the most complex problems confronted by the HVAC industry is controlling air flow through process chambers, such as the clean rooms used in semiconductor integrated-circuit chip manufacturing, or the medical and biotechnology laboratories kept at below atmospheric pressure to prevent potentially dangerous microbes from blowing out of the laboratories. Some air exits the process chamber through process equipment and other work stations with fume hoods. A partial vacuum is usually required in such equipment in order to ensure that noxious fumes or dangerous microbes do not leak from the process equipment or fume hoods and thereby endanger personnel working nearby. It is frequently important that a constant partial vacuum be maintained in the process equipment in order to minimize defects in the integrated circuit chips being manufactured. In some process equipment it is important that only a small partial vacuum be maintained.

U.S. Pat. No. 3,053,272 to Babson shows two embodiments of a vacuum regulator, which uses a piston having a top face exposed to fluid pressure just upstream of the piston, and a bottom face exposed to the environment pressure. Fluid flows between the top and bottom faces of the piston. Babson shows only one regulator to control the flow from several lines. U.S. Pat. No. 4,732,190 to Polselli shows a shut-off valve using pistons having a structure similar to that of the Babson piston. U.S. Pat. No. 3,766,933 to Nicholson, Jr., shows a vacuum release valve, which vents the fluid conduit to the atmosphere under certain conditions. U.S. Pat. No. 3,312,241 to Bryant shows a flow control device, which uses a split-airfoil structure to alter the impedance on the flow. U.S. Pat. No. 4,092,998 to Taplin shows several embodiments of an automatic pressure regulator having a rolling diaphragm. The position of the piston and the rolling diaphragm is determined by the force applied by a spring under tension, and the fluid pressures just upstream and just downstream of the constriction point.

U.S. Pat. No. 3,978,883 to Petersen shows a regulator with two independently movable elements located on opposite sides of the flow conduit. U.S. Pat. No. 4,873,873 to Day shows a metering system having two gates located on opposite sides of the flow conduit.

U.S. Pat. No. 4,250,915 to Rikuta shows several embodiments of flow regulating valves. In each of the embodiments the weight of piston tends to narrow the flow path or a portion of the flow path.

DISCLOSURE OF INVENTION

The invention is directed to a regulator, which may be used to regulate in a remote region a constant partial vacuum. The regulator controls the flow of gas from an environment, through a region and to an evacuation means. The regulator's fluid path, which preferably is not vented at any point between the regulator's inlet and outlet, is bounded on opposite sides by first and second plates, which are movably mounted—preferably, hingedly mounted. The two plates are substantially parallel to each other. Each of the plates have a conduit side, facing the fluid path, and a side facing a reference pressure. It is preferred that the reference-pressure sides of the plates have equal areas exposed to the reference pressures, and the conduit sides have equal areas exposed to the fluid pressure in the path.

Attached to the plates is an impeder for variably impeding the flow through the path based on the position of the plates. A restoring force is applied to the plates for urging the plates to move in a direction that lessens the impedance on the flow.

Preferably, the impeder includes a fixed grate and a movable grate. The fixed grate is disposed in the fluid path so that it does not move with respect to the path. The movable grate is hingedly attached to the pivotally mounted plates at points distal from the pivot points. The two grates are disposed immediately adjacent to each other, so that as the movable grate moves with respect to the fixed grate the impedance on the flow varies.

In a preferred embodiment, there is a substantial pressure drop between the region and the plates, which may be caused by a long fluid path or a constriction in the path. The first plate's reference-pressure side is exposed to the region's pressure, and the second plate's reference-pressure side is exposed to the environment's pressure.

In one embodiment, the first plate is mounted above the path, the second plate is mounted below the path, and the restoring force includes the weight of the plates. In a preferred embodiment, a weight is attached to the plates, so as to provide a torque about the plates' pivot points.

In one embodiment, the movable grate includes one portion of an airfoil, and the fixed portion includes another portion of an airfoil, such that when the impeder is in the position creating the least impedance the two airfoil portions form a complete airfoil.

The invention is particularly useful when the partial vacuums in several regions all of which are attached to a single vacuum source, so that, as the flow from one region varies, the apparent strength of the vacuum source changes for the other regions. By using a separate regulator for each of the regions, a constant partial vacuum may be maintained in each of them.

DESCRIPTION OF SPECIFIC EMBODIMENTS

Figure 1:
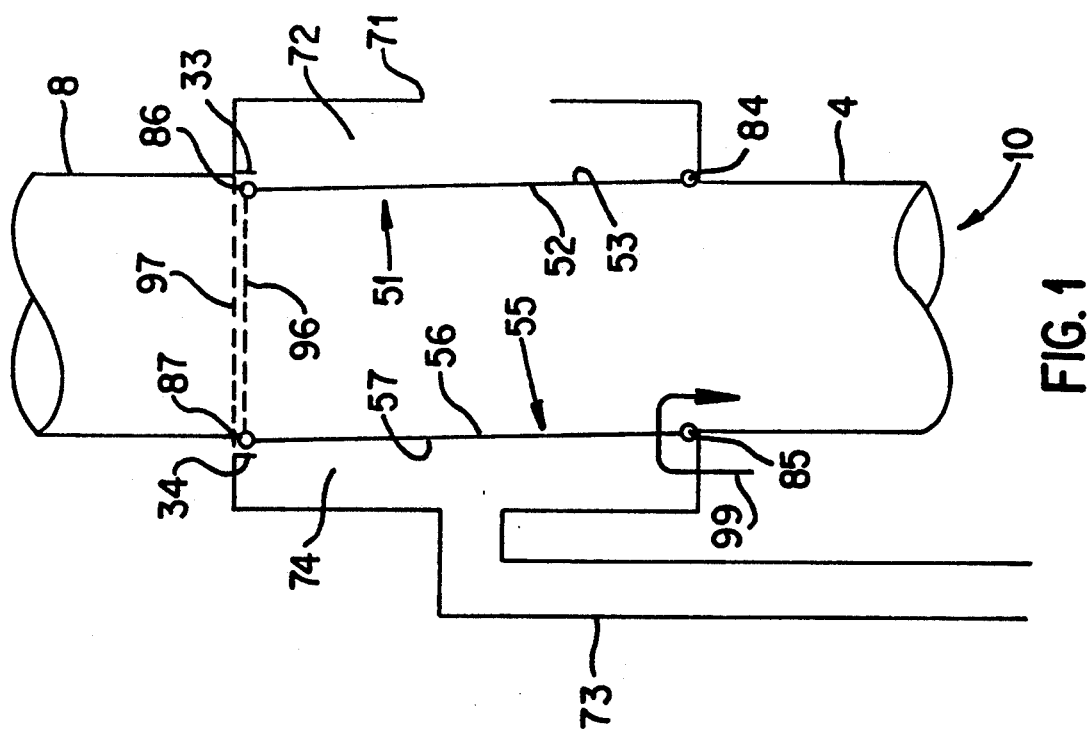
FIG. 1 shows a cross-section of a regulator that varies the impedance on the flow based on a pair of reference pressures.
Figure 5:
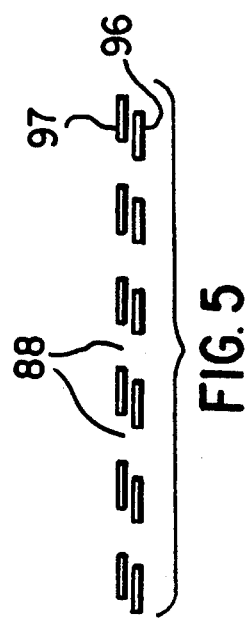
FIGS. 5 and 6 show respectively a simple two-grate structure and a split-airfoil structure, both of which may be used to impede the flow of fluid.

FIG. 1 shows a device according to the present invention. This device has a structure similar to the regulator shown in FIG. 7, which is the same device shown in FIGS. 5–8 of U.S. patent application Ser. No. 07/850,767 (now issued as U.S. Pat. No. 5,251,654) for a FLOW REGULATOR ADAPTABLE FOR USE WITH EXHAUST FROM A PROCESS CHAMBER (the "Parent Application") referenced hereinabove. The FIG. 1 device has a fluid conduit 10 from the inlet 4 to the outlet 8. Two plates, 55 and 51, are located on opposite sides of the conduit 10. Both plates are hingedly mounted, so that the first plate 55 pivots about point 85, and second plate 51 pivots about point 84. Each plate (55 and 51) has one side (56 and 52 respectively) facing the conduit 10, while its other side (57 and 53 respectively) faces a separate reference chamber (74 and 72 respectively).

Preferably, the reference-pressure sides, 57 and 53, have the same area exposed to their respective reference chambers, 74 and 72. Likewise, the conduit sides, 56 and 52, preferably have the same area exposed to the conduit 10. (It is preferred that the plates' reference-pressure sides, 57 and 53, and conduit sides, 56 and 52, be flat and generally perpendicular to the plates' direction of movement. If, however, they are not flat planes perpendicular to the direction of movement of the plates, 55 and 51, the effective areas of the reference-pressure sides—i.e., the projection of the exposed areas of the faces on a plane perpendicular to the direction of movement of the plates—should, in a preferred embodiment, be equal; likewise, the effective exposed areas of the conduit sides should, in a preferred embodiment, be equal.)

A movable grate 96 is attached the plates, 55 and 51, at hinge points 87 and 86, so that, as the plates rotate clockwise and counterclockwise about points 85 and 84, the movable grate 96 moves to the right and the left. The movable grate 96 keeps the two plates, 55 and 51, separated.

Another grate 97 is fixedly attached to the walls of the conduit 10 right next to the movable grate 96. The grates provide an impedance to the flow through the device. The grates may be lined up with respect to each other so that the apertures in each grate are lined up with the apertures in the other grate. When the apertures are lined up, the passageways through the grates are at their widest, and the grates provide the least impedance to the flow. A stop 33 is provided to ensure that the movable grate 96 can only move in one direction from this position of least impedance. As the movable grate 96 moves with respect to the fixed grate 97, and the apertures of one grate move with respect to the apertures of the other grate, the passageways (item 88 in FIG. 5) through the grates narrow, and the impedance of the grates increases. The grates' impedance increases until the passageways 88 (or constriction points, as they may be called) become very narrow or until they are completely closed. A second stop 34 prevents the movable grate 96 from moving past this position of the highest impedance.

Figure 6:
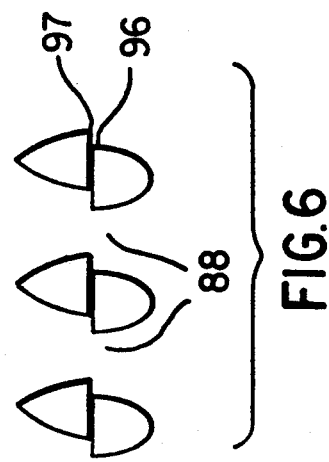
Figure 7:
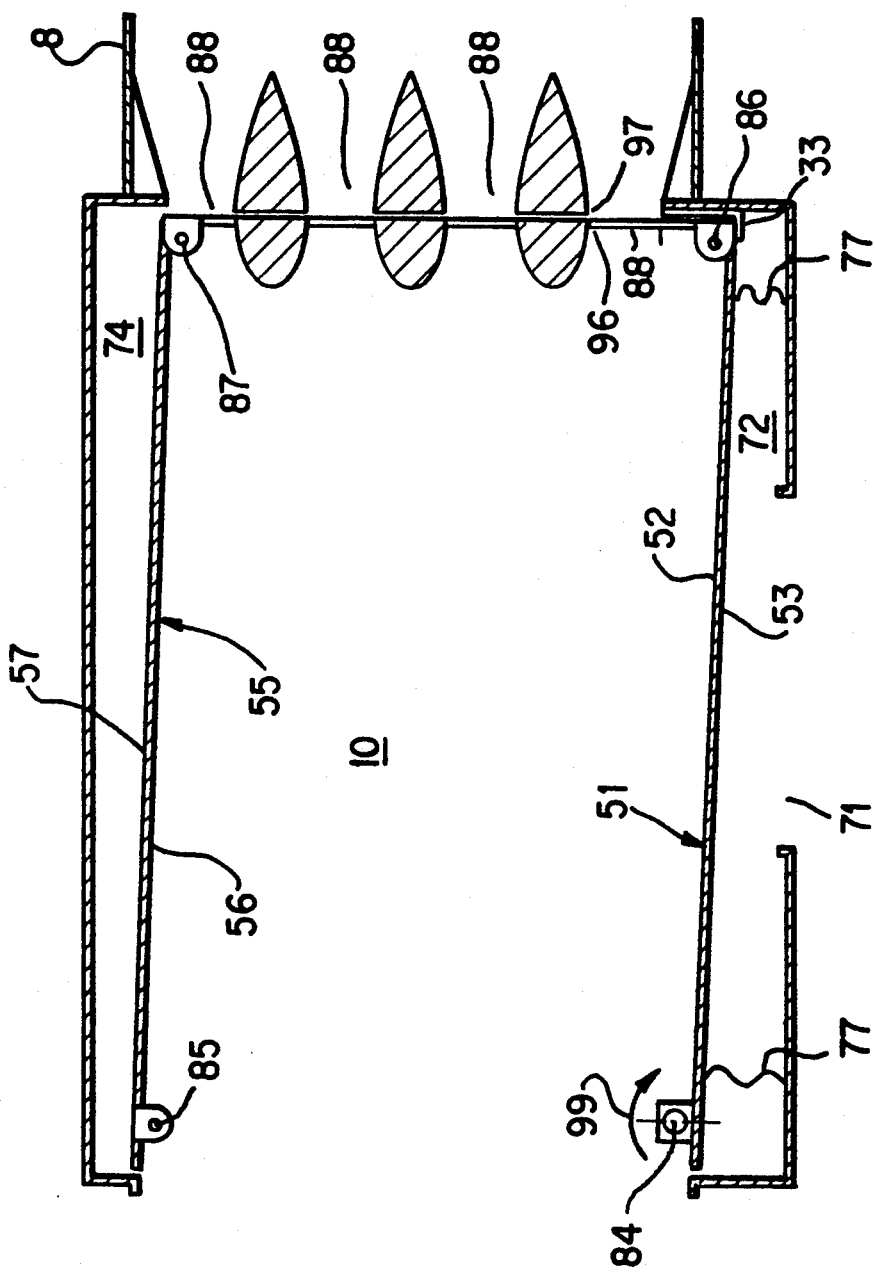
FIG. 7 shows a regulator that varies the impedance on the flow based on a reference pressure and the pressure of fluid flowing through the regulator.

The grates, 96 and 97, perform the same function as the split-airfoil structure shown FIGS. 6 and 7 herein. The grates impart more turbulence to the flow, and as a result are noisier, than the split-airfoil structure. The grates and the split-airfoil structure may be substituted for each other in any embodiment that uses the other, without any significant difference in performance except for noise, and perhaps the amount of impedance. The somewhat more complicated split-airfoil structure, shown in FIG. 6, is essentially the simple two-grate structure, shown in FIG. 5, with a portion of an airfoil attached to each element of the grates, 96 and 97. The rear portions of the airfoils are attached to the fixed grate 97, and the leading portions of the airfoils are attached to the movable grate 96. Both structures variably constrict the passageways 88, as the movable portions 96 are displaced with respect to the fixed portions 97. Although, in the embodiments shown in FIGS. 1, 2, 5 and 6, the movable grate 96 is upstream of the fixed grate 97, it may be mounted downstream instead.

Figure 2:
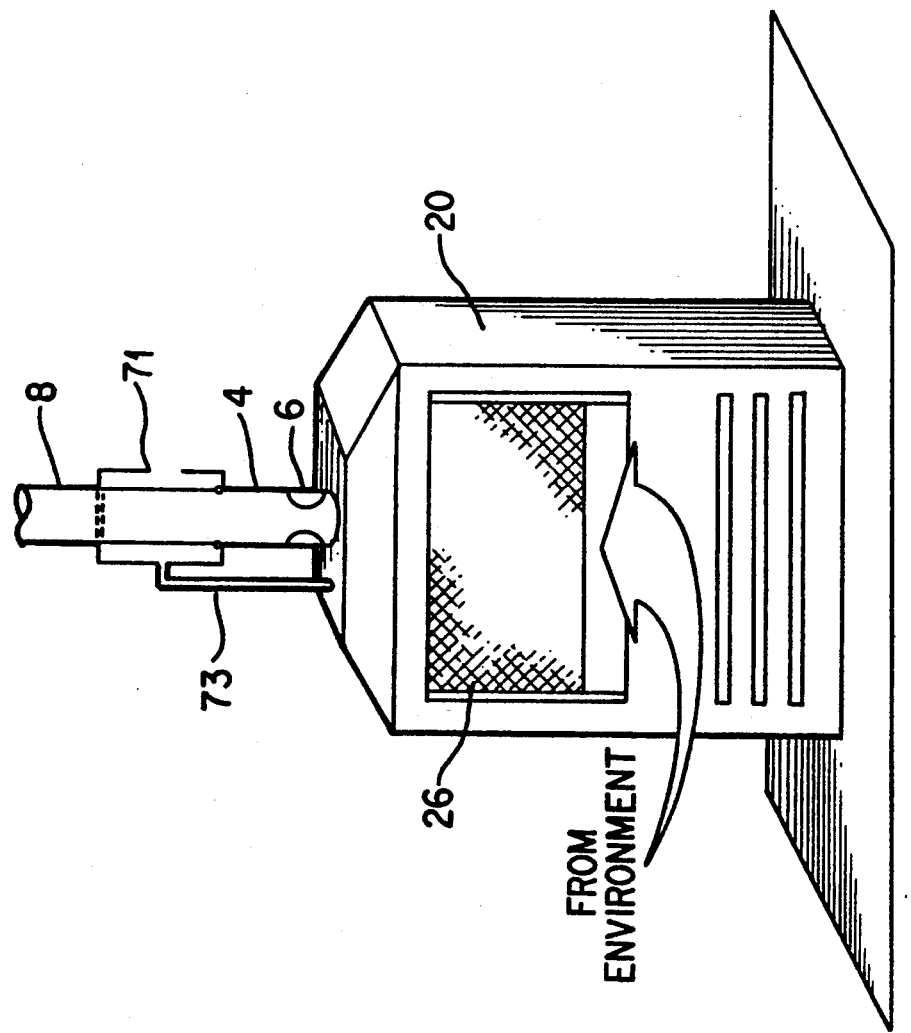
FIG. 2 shows how the regulator of FIG. 1 may be used to maintain a constant partial vacuum in a fume hood when there is a substantial pressure drop in the fluid flowing from the fume hood to the regulator.

The reference-pressure side 57 of the left plate 55 is exposed to reference-pressure chamber 74, which may be attached by port 73 to a piece of equipment, such as a fume hood 20, as shown in FIG. 2. The reference-pressure side 53 of the right plate 51 is exposed to reference-pressure chamber 72, which may be vented to the environment's pressure through port 71, as shown in FIG. 2.

A restoring torque, represented by arrow 99, urges the plates, 56 and 51, to the right, the direction that tends to open the passageways 88 and lower the impedance of the grates, 96 and 97. The position of the plates and the movable grate 96 is determined by the pressures in the reference chambers, 74 and 72, and the restoring torque 99. The pressure of fluid in the conduit 10 does not directly affect the position of the plates and the movable grate 96, because the conduit-side faces, 56 and 52, have the same area and the pressure acting on them is the same but in opposite directions.

Since the pressure in the conduit 10 between the plates, 55 and 51, does not affect the position of the movable grate 96, the grates, 96 and 97, may be located upstream of (below) the plates, 55 and 51. In such an embodiment, the pivot points, 84 and 85, may be located above hinge points 86 and 87, so that the plates, 51 and 55, hang down from the pivot points. The restoring torque still should be applied about one of the pivot points, 84 and 85, so as to tend to open the passageways through the grates.

Figure 3:
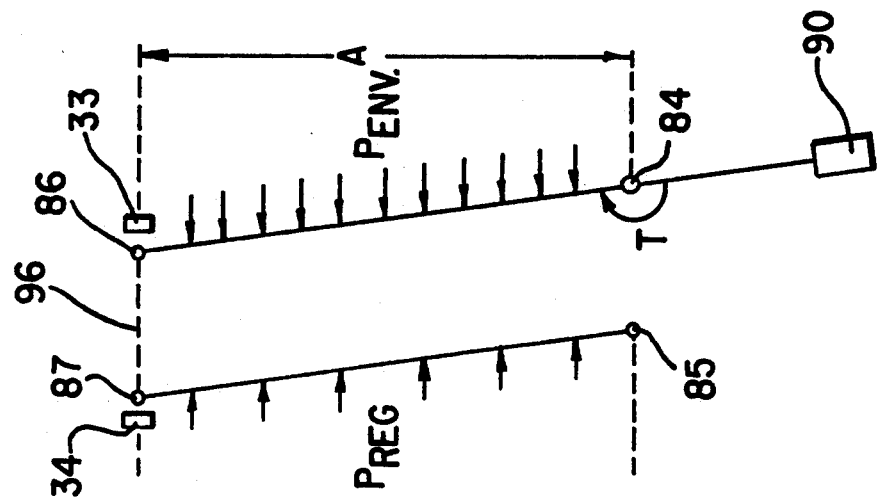
FIG. 3 represents the forces that act on the FIG. 1 regulator to control the flow impedance.

FIG. 3 shows the various forces affecting the position of the movable grate 96. The pressure ($P_{REG}$) in the fume hood 20 or other region imposes through conduit 73 a clockwise torque around the pivot points, 85 and 84. The pressure in the environment ($P_{ENV}$) imposes a counterclockwise torque around the pivot points, 85 and 84. During normal operation, fluid flows into the fume hood from the environment, and thus the pressure ($P_{REG}$) on the left plate's reference side 57 is less than the pressure ($P_{ENV}$) on the right plate's reference side 53. Because of this pressure differential and because the areas (A) of the plates are the same, the reference pressures ($P_{REG}$ and $P_{ENV}$) result in a net counter-clockwise torque, which tends to narrow the passageways 88. The greater the pressure differential between the region 20 and the environment, the greater this torque will be.

This counterclockwise torque is offset by a clockwise torque T (represented in FIG. 1 by arrow 99). Applying the torque about either pivot point, 85 or 84, is equally effective. There are many ways to effect this clockwise restoring torque (called "restoring" since it restores the regulator to the position assumed when the vacuum source is turned off—the lowest impedance position). A compressed spring may be mounted in the left reference chamber 74 to press against the left plate's left face 57, or a spring under tension may be mounted in the right reference chamber 72 to pull the right plate 51 to the right. Other means for applying a torque include the use of a DC electric motor in a stalled condition (which is essentially the use of electromagnetic force) and the use of a piston and cylinder arrangement as may be found in a pneumatic or hydraulic control system.

Another means for applying a torque, which may be used as an alternative to, or in combination with, or to oppose any of the foregoing means, is to use a weight attached to one of the pivot points, 85 and 84, to provide the desired torque. The weight of the plates may be used in this way. In one such arrangement, the regulator may be mounted on its side, like the regulator shown in FIG. 7, so that the weight of the movable grate 96 and plates, 55 and 51, tend to open the passageways 88 and lower the regulator's impedance (i.e., turned 90° clockwise from its orientation in FIGS. 1 and 2 of the present application). The weight of the plates may be offset by a spring or other means, as discussed in the concurrently filed application Ser. No. 07/965,909 for a REGULATOR FOR MAINTAINING A SMALL PARTIAL VACUUM, referenced hereinabove.

As shown in FIG. 3 of the present application, a counterweight 90 may be mounted below the pivot point 84 (on the side opposite the pivot point from plate 51) to apply torque. Note that the torque applied by the weight 90 is opposed by the torque generated by the weight of the movable grate 95 and those portions of the plates, 55 and 51, above the pivot points, 85 and 84. In this embodiment, the torque applied by the weight should be greater than the torques opposing it. (Alternatively, the weight 90 may be mounted on a horizontal, or nearly horizontal, rod attached to and extending from the right of the pivot point 84, while the plate 51 extends generally upwards from the pivot point 84.)

No matter what combination of means for applying torque is applied, the sum of torques around the pivot points should tend to open the passageways 88 when there is no flow through the regulator. In a preferred embodiment, only a small restoring torque is needed to maintain the desired partial vacuum.

In a preferred embodiment, the weight 90 may be slidably mounted on a rod, so as to permit adjustment of the desired partial vacuum. It is expected that in practice the weight 90 will be set in position once, when the fume hood 20 is installed, to provide the partial vacuum appropriate for the fume hood. If, however, it is desired to have a controller alter the partial vacuum, the weight may be moved along the rod by a stepper motor to alter the restoring torque (like the slidable weight shown in FIG. 4 of the Parent Application), which as noted above is now issued as U.S. Pat. No. 5,251,654.

In the FIG. 2 arrangement, the regulator is attached to a fume hood 20, or other piece of process equipment, which is located in a process chamber or other environment. Air flows from the environment, past the fume hood's door 26 into the fume hood 20, where noxious gases, microbes or other potentially dangerous contaminants may be picked up by the air. Typically, the impedance on the flow from the environment into the fume hood region 20 varies, because the fume hood's door 26 is opened and closed. When the door 26 is opened, the impedance to the flow from the environment into the fume hood 20 is lessened; When it is closed, the door's impedance on the flow increases. After passing through the equipment, the air is then pulled past a resistance 6, which may be caused by a narrow portion of the fluid conduit 4, or by a very long length of conduit leading to the regulator. The resistance 6 causes a substantial pressure drop in the air flowing past it. After flowing through the regulator's outlet 8, the air is pulled to the vacuum source.

The system shown in FIG. 2 regulates the partial vacuum in the fume hood 20 with respect to the environment. The constant partial vacuum creates a constant air velocity into the fume hood no matter how much the fume hood's door 26 is open (assuming the vacuum source is strong enough). To maintain a constant partial vacuum, and gas velocity, the volume flow rate into the fume hood 20 must be varied. The FIG. 2 system quickly adapts to changes to maintain the partial vacuum.

If flow into the fume hood 20 or other equipment from the environment is further impeded (such as when the door 26 is closed), there is a transient drop in the pressure in the fume hood 20 ($P_{REG}$). $P_{REG}$ would remain low if the fume hood 20 was attached directly to the vacuum source without the FIG. 1 regulator. With the arrangement shown in FIG. 2, the drop in the fume-hood pressure, $P_{REG}$, causes a pressure drop in reference-chamber 74. Because of this drop in $P_{REG}$ and because the environment's pressure, $P_{ENV}$, remains the same, the plates, 55 and 51, and the movable grate 96 move to the left, thereby narrowing the passageways 88. The narrowing of the passageways 88 increases the impedance between the region 20 and the vacuum source, thereby offsetting the increased impedance between the region 20 and the environment, so that a constant partial vacuum is maintained in the region 20.

Likewise, the decreasing of the impedance to the flow from the environment into the region 20, as when the door 26 on the equipment is opened, causes a momentary increase in $P_{REG}$, which in turn causes the plates, 55 and 51, and the movable grate 96 to move to the right. This movement of the movable grate 96 decreases the impedance between the region 20 and the vacuum source and counteracts any transient pressure increase in the equipment.

Similarly, an increase in the environment's pressure, $P_{ENV}$, causes the movable grate 96 to move to the left to maintain a constant pressure differential between the reference-pressure chambers, 74 and 72. The movement of the movable grate 96 in this direction increases the impedance on the flow between the region 20 and vacuum source, thereby increasing the pressure in the region 20 and maintaining a fairly constant partial vacuum. Likewise, a drop in the environment's pressure causes the movable grate 96 to move to the right to maintain the constant pressure differential between the reference pressure chambers, 74 and 72, and thereby maintain the constant pressure differential between the region 20 and the environment—i.e., the constant partial vacuum in the equipment.

The arrangement in FIG. 2 can also maintain a fairly constant partial vacuum in spite of fluctuations in the strength of the vacuum source, which can happen when "cross-talk" between flow regulators occurs—i.e., when the flow rate changes in other, parallel fluid paths to a common vacuum pump. An increase in the vacuum source's strength would cause a decrease in the region's pressure, $P_{REG}$, if the regulator was not attached between the vacuum source and the equipment. However, in the FIG. 2 system the onset of the increased vacuum source strength causes a minute decrease in the pressure in the region 20, which in turn causes the movable grid 96 to move to the left, which increases the flow impedance between the region 20 and the vacuum source, thereby offsetting the increased strength of the vacuum source. Likewise, a decrease in the vacuum source strength causes the movable grid 96 to move to the right, which decreases the regulator's flow impedance, offsetting the decreased strength of the vacuum source.

Thus, the system shown in FIG. 2 provides very rapid responses to fluctuations in the environment pressure, the vacuum source's strength, and the opening and closing of the fume hood's door 26.

Certain conditions are required for the proper functioning of the regulator. In order to obtain the desired partial vacuum, the vacuum source must be strong enough to create the necessary pressure differential between the reference-pressure chambers, 74 and 72. Also, the impedance between the environment and the equipment cannot be too high or too low. For example, if the equipment is hermetically sealed from the environment, the movable grate 96 will be pushed as far as to the left as it can go (so that it hits stop 34), thereby creating as much flow impedance as it can. In such a situation, air from the right reference chamber 72 could be sucked past the right plate 51, unless there is an effective seal (such as a flexible membrane) separating the right reference chamber 72 and the conduit 10. (The grates may be designed so that the grate position imparting the greatest impedance still permits some flow from the region 20 to the vacuum source.) If there is too little impedance between the environment and the region 20, the movable grate 96 may be forced as far to the right as it can go (so that it hits stop 33), creating as little impedance as it can. In such a situation, the partial vacuum in the region 20 will not be as large as desired. (Electric contacts, or other type of sensor or switch, may be used to provide a signal when either of the stops, 34 and 33, is being hit.)

As noted above, FIG. 7 shows a device somewhat similar in structure to the FIG. 1 device. Unlike the FIG. 1 device which is vertically oriented, the FIG. 7 device is oriented horizontally. The FIG. 7 device uses the weight of the plates 51 and 55 to create a restoring torque. The FIG. 7 device uses the split-airfoil structure to create impedance on the flow, instead of the noisier impedance structure used in the FIG. 1 device. The FIG. 1 device can of course be easily adapted to assume a horizontal orientation and to use the split-airfoil impedance structure.

The lower reference chamber 72 in the FIG. 7 device is, in a preferred embodiment, exposed to the environment's pressure through port 71, just like the system shown in FIG. 2. However, the upper chamber 74 in the FIG. 7 device is not directly vented to a region in which a partial vacuum is being maintained. Instead, this chamber 74 is vented to fluid in the conduit. The pressure on the upper plate's lower side 56 is the same as the pressure on the lower plate's upper side 52.

A flexible membrane 77 issued to isolate the lower reference chamber 72 from fluid in the conduit 10. That portion of the lower plate's reference-pressure side 53 that falls outside of the flexible membrane 77, is exposed to the same pressure as in the upper reference chamber 74. (Flexible membranes may also be used in the FIG. 1 embodiment to isolate both reference chambers, 74 and 72, from the conduit 10. In order to maintain the desired pressure differential between the two reference chambers of the FIG. 1 device, the areas of the plates' reference-pressure sides, 57 and 53, exposed to their respective reference pressures, $P_{ENV}$ and $P_{REG}$, should be almost the same.)

The position of the movable grate 96 in the FIG. 7 device depends on the pressure in the upper reference chamber 74, the pressure in the lower reference chamber 72, the area of the lower plate's lower face 53 exposed to the reference pressure in the lower chamber 72, and the restoring torque 99 (which is caused by the weight of the plates, 55 and 51, and the movable portion of the split-airfoil structure 96, and which may be lessened—or increased—with a counter-weight, a spring or other means). The position of the movable grate 96, and accordingly the amount of impedance imparted to the flow through the conduit 10, is affected by the pressure in the conduit 10, unlike the FIG. 1 device.

Although it is preferred to use two plates in the FIG. 7 device, it will be appreciated that an embodiment with only the lower plate is possible. Instead of using the upper plate, a guide may be mounted on the walls of the conduit to keep the movable grate from falling down and to keep the movable grate oriented perpendicular to the flow through the conduit. (This embodiment is similar to the device shown in FIG. 1 of the Parent Application, now issued as U.S. Pat. No. 5,251,654 except that a split-airfoil structure, the movable portion of which is hingedly attached to the plate, is used as a variable impeder instead of the upturned section of the piston shown in FIG. 1 of Parent Application.) The position of the movable grate in such a single-plate embodiment depends on the pressure differential across the lower plate, which is influenced by the Bernoulli effect caused by the flow through the conduit. Such an embodiment is better suited to regulating the flow rate through the conduit 10, whereas the embodiment shown in FIGS. 1 and 7 are better suited for maintaining a constant partial vacuum.

The FIG. 7 device is well suited for maintaining a constant partial vacuum in a region 20 when the pressure in the conduit 10 adjacent the plate 51 is very close to the pressure in the region 20. When, however, there is a substantial pressure drop between the region and the plates, 51 and 55, the FIG. 7 device is not as well suited as the FIG. 1 device for maintaining a partial vacuum in a region. Sometimes, process equipment has only a narrow outlet for connection to the vacuum source. Sometimes, the regulator must be mounted in the vacuum conduit far downstream of the equipment 20. In both of these situations, a large pressure drop may be created between the equipment and the regulator, and as a result, the pressure in the conduit 10 inside the regulator may be substantially different from the pressure inside the equipment 20. Since the impedance created by the FIG. 1 device does not depend on the pressure in the conduit 10, it is better suited for maintaining a constant partial vacuum in such situations.

Because the impedance caused by the FIG. 7 depends on the pressure in the conduit 10 adjacent lower plate 51, the grates, 96 and 97, should be located downstream of the plate 51 if the device is to be used for maintaining a constant partial vacuum in a region. Otherwise, the grates, 96 and 97, will cause a varying pressure drop between the region and the lower plate's upper face 52, and the device will not be able to maintain a constant partial vacuum in the region with respect to the environment.

If, however, it is desired to attach a regulator between an air supply and a region to maintain a constant pressure differential between the region and an environment, where the pressure in the region is greater than the environment's pressure (like the devices shown in U.S. patent application Ser. No. 07/852,084 for a FLOW REGULATOR ADAPTABLE FOR USE WITH PROCESS-CHAMBER AIR FILTER, referenced hereinabove), the grates should be located upstream of the plates. The pivot points, 84 and 85, about which the plates pivot, should be located downstream of the plates. In addition, the lower chamber 72 should be vented to the conduit pressure, and the pressure in the upper chamber should be vented to the environment. The conduit 10 should be connected directly to the region, so that the pressure on the lower plate's lower face is substantially the same as region's pressure, which is greater than the environment's pressure. This pressure differential between the upper and lower chambers urges the plates upwardly and thereby causes the grates to further impede flow. The restoring torque may simply be caused by the weight of the plates and the movable grid, and it should tend to open the passageways through the grates.

Likewise, the device shown in FIG. 1 may be adapted to connect an air source to a region and maintain at a constant level a higher pressure in the region with respect to an environment. To effect such an adaptation, the left reference chamber 74 is vented to the environment, and the right reference chamber 72 is connected to the region. The top of the device is connected to the air source, instead of a vacuum source, while the bottom of the device remains connected to a region. When the environment's pressure drops or the pressure of air from the source increases, the impedance on the flow increases. When the environment's pressure rises or the source's pressure drops, the impedance on the flow decreases. The restoring torque should tend to open the passageways through the grates. Since the position of the movable grate 96 is not directly affected by pressure in the conduit 10, the grates may be mounted above or below the plates.

Figure 4:
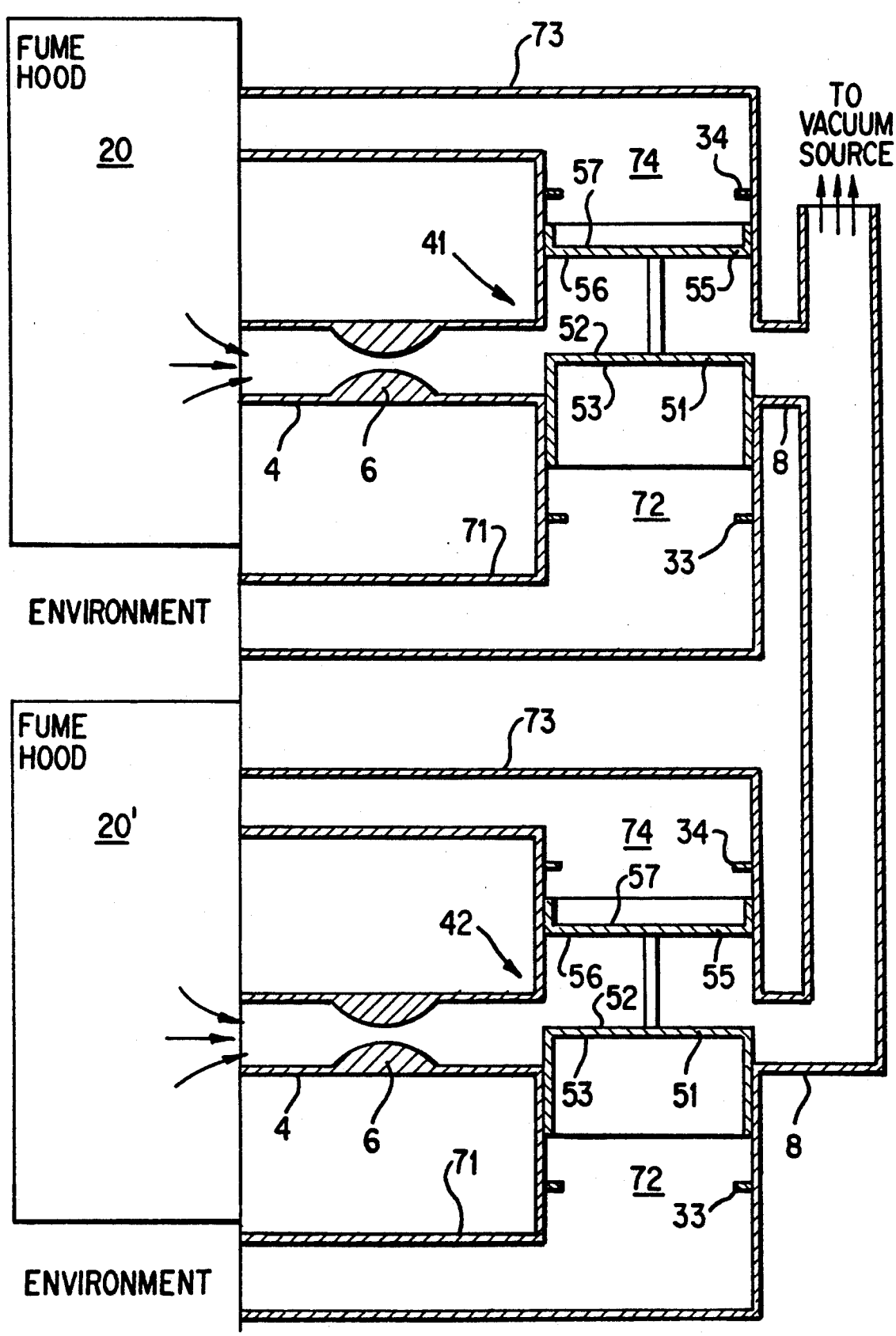
FIG. 4 shows a cross-section of a system having two regulators of an alternative design, each of which varies the impedance on the flow based on a pair of reference pressures.

FIG. 4 shows two regulators, 41 and 42, arranged in parallel to maintain constant partial vacuums in two separate fume hoods, 20 and 20'. As in the FIG. 2 arrangement, there is a substantial pressure drop between each region, 20 and 20', and its respective regulator, 41 and 42, caused by some type of resistance 6. In this alternative embodiment, the plates, 55 and 51, are rigidly attached to each other, and the impedance is created by the rim of the lower plate 51. The weight of the plates, 55 and 51, and the rod connecting them create a restoring force which tends to lessen the impedance on the flow. The upper reference chamber 74 is attached directly to the region, 20 or 20', upstream of the resistance 6. The lower reference chamber 72 is vented to the environment, with respect to which the partial vacuum in the region is to be maintained.

With this arrangement, a constant partial vacuum may be maintained in each of the fume hoods even though its door and the door of the other fume hood may be opened and closed. Different partial vacuums may be maintained in each of the fume hoods, 20 and 20', simply by having a different restoring forces for each of the regulators—i.e. plates of different weights.

What is claimed is:

1. A system for regulating the flow of gas from an environment, through a region and to an evacuation means, so as to maintain a substantially constant partial vacuum in the region with respect to the environment, the device comprising:
   a path, through which gas passes from the region to the evacuation means;
   a reference chamber located adjacent the path;
   first and second plates, movably mounted at opposite sides of the path so that the two plates are substantially parallel to each other, both the first plate and the second plate having a conduit side, facing the path, and a reference-pressure side, the second plate's reference-pressure side being exposed to the environment's pressure, and the first plate's reference-pressure side being exposed to the reference chamber;
   a flow resistor for causing a substantial pressure drop in the path from the region to the plates;
   a reference conduit connecting the region directly to the reference chamber so as to bypass the flow resistor and so that the pressure in the reference chamber is the same as the region's pressure;
   impedance means attached to the plates for variably impeding the flow through the path based on the position of the plates; and
   restoring means for urging the plates to move in a direction that lessens the impedance on the flow.

2. A system according to claim 1, wherein the reference-pressure sides of the first and second plates have effective areas exposed to the region's pressure and the environment's pressure respectively, and the effective areas of the first and second plates are substantially equal.

3. A system according to claim 1, wherein the first and second plates are hingedly mounted so that each plate rotates about a pivot point.

4. A system according to claim 3, wherein the reference-pressure sides of the first and second plates have effective areas exposed to the region's pressure and the environment's pressure respectively, and the effective areas of the first and second plates are substantially equal.

5. A system according to claim 3, wherein the first plate is mounted above the path, the second plate is mounted below the path, and the restoring means includes the weight of the plates.

6. A system according to claim 3, wherein the restoring means includes a weight attached to the plates, so as to provide a torque about the pivot points.

7. A system according to claim 3, wherein the impedance means includes a fixed grate disposed in the path so that it does not move with respect to the path, and a movable grate hingedly attached to the first and second plates at points distal from the pivot points, the movable grate being disposed immediately adjacent to the fixed grate, so that as the movable grate moves with respect to the fixed grate the impedance on the flow varies.

8. A system according to claim 7, wherein the reference-pressure sides of the first and second plates have effective areas exposed to the region's pressure and the environment's pressure respectively, and the effective areas of the first and second plates are substantially equal.

9. A system according to claim 7, wherein the first plate is mounted above the path, the second plate is mounted below the path, and the restoring means includes the weight of the plates and the movable grate.

10. A system according to claim 7, wherein the movable grate includes a first portion of an airfoil, and the fixed portion includes a second portion of an airfoil, such that when the impedance means is creating the least impedance the two airfoil portions form a complete airfoil.

11. A system according to claim 7, wherein the restoring means includes a weight attached to the plates, so as to provide a torque about the pivot points.

12. A system according to claim 11, wherein the reference-pressure sides of the first and second plates have effective areas exposed to the region's pressure and the environment's pressure respectively, and the effective areas of the first and second plates are substantially equal.

13. A device for regulating fluid flow, the device comprising:
   a path, through which fluid passes;
   first and second plates, hingedly mounted at opposite sides of the path, so that each plate rotates about a pivot point and the two plates are substantially parallel to each other, both the first plate and the second plate having a conduit side, facing the path, and a reference-pressure side, the first plate's reference-pressure side being exposed to a first reference pressure, and the second plate's reference-pressure side being exposed to a second reference pressure;
   impedance means attached to the plates for variably impeding the flow through the path based on the position of the plates.

14. A device according to claim 13, wherein the impedance means includes a fixed grate disposed in the path so that it does not move with respect to the path, and a movable grate hingedly attached to the first and second plates at points distal from the pivot points, the movable grate being disposed immediately adjacent to the fixed grate, so that as the movable grate moves with respect to the fixed grate the impedance on the flow varies.

15. A device according to claim 13, wherein the reference-pressure sides of the first and second plates have effective areas exposed to the respective reference pressures, and the effective areas of the first and second plates are substantially equal.

16. A device according to claim 15, wherein the impedance means includes a fixed grate disposed in the path so that it does not move with respect to the path, and a movable grate hingedly attached to the first and second plates at points distal from the pivot points, the movable grate being disposed immediately adjacent to the fixed grate, so that as the movable grate moves with respect to the fixed grate the impedance on the flow varies.

17. A device according to claim 13, further including restoring means for urging the plates to move in a direction that lessens the impedance on the flow.

18. A device according to claim 17, wherein the restoring means includes a weight attached to the plates, so as to provide a torque about the pivot points.

19. A device according to claim 17, wherein the impedance means includes a fixed grate disposed in the path so that it does not move with respect to the path, and a movable grate hingedly attached to the first and second plates at points distal from the pivot points, the movable grate being disposed immediately adjacent to the fixed grate, so that as the movable grate moves with respect to the fixed grate the impedance on the flow varies.

20. A device according to claim 19, wherein the reference-pressure sides of the first and second plates have effective areas exposed to the respective reference pressures, and the effective areas of the first and second plates are substantially equal.

21. A system for regulating fluid flow, the system comprising:
   a path, through which fluid passes;
   a plate, hingedly mounted so the plate rotates above a pivot point, the plate having a reference-pressure side, the plate's reference-pressure side being exposed to a reference pressure;
   a fixed grate disposed in the path so that it does not move with respect to the path;
   a movable grate hingedly attached to the plate at a point distal from the pivot point, the movable grate being disposed immediately adjacent to the fixed gate, so that the movable and fixed grates impart an impedance to the flow through the path, and so that, as the movable grate moves with respect to the fixed grate, the impedance on the flow varies, wherein the movable grate includes a first portion of an airfoil, and the fixed grate includes a second portion of an airfoil, such that when the grates are creating the least impedance on fluid flowing through the path the two airfoil portions form a complete airfoil; and
   restoring means for applying a torque about the pivot point that urges the plate to move in a direction that lessens the impedance on the flow.

22. A system for regulating the flow of gas from an environment, through a first and second region, to an evacuation means, so as to maintain substantially constant partial vacuums in the regions with respect to the environment, the device comprising:
   a first path, through which gas passes from the first region to the evacuation means;
   a second path, through which gas passes from the second region to the evacuation means;

first and second plates, movably mounted at opposite sides of the first path so that the two plates are substantially parallel to each other, both the first plate and the second plate having a conduit side, facing the first path, and a reference-pressure side, the second plate's reference-pressure side being exposed to the environment's pressure, and the first plate's reference-pressure side being exposed to a first chamber which is connected directly to the first region so that the pressure in the first chamber is the same as the first region's pressure;

third and fourth plates, movably mounted at opposite sides of the second path so that the two plates are substantially parallel to each other, both the third plate and the fourth plate having a conduit side, facing the second path, and a reference-pressure side, the fourth plate's reference-pressure side being exposed to the environment's pressure, and the third plate's reference-pressure side being exposed to a second chamber which is connected directly to the second region so that the pressure in the second chamber is the same as the second region's pressure;

first impedance means attached to first and second plates for variably impeding the flow through the first path based on the position of the first and second plates;

second impedance means attached to third and fourth plates for variably impeding the flow through the second path based on the position of third and fourth plates;

first restoring means for urging first and second plates to move in a direction that lessens the impedance on the flow in the first path; and second restoring means for urging third and fourth plates to move in a direction that lessens the impedance on the flow in the second path.

23. A device according to claim 21, wherein the restoring means includes the plate's weight.

24. A device according to claim 21, wherein the restoring means includes a weight attached to the plate, so as to provide a torque about the pivot point.

* * * * *

UNITED STATES PATENT AND TRADEMARK OFFICE
CERTIFICATE OF CORRECTION

PATENT NO. : 5,320,124
DATED : June 14, 1994
INVENTOR(S) : David W. Palmer

It is certified that error appears in the above-indentified patent and that said Letters Patent is hereby corrected as shown below:

Column 12, line 38, "above" should be --about--.

Signed and Sealed this

Eighteenth Day of April, 1995

Attest:

BRUCE LEHMAN

Attesting Officer

Commissioner of Patents and Trademarks